(12) United States Patent
Mathew et al.

(10) Patent No.: US 9,933,782 B2
(45) Date of Patent: Apr. 3, 2018

(54) LOCATIONAL AND DIRECTIONAL SENSOR CONTROL FOR SEARCH

(71) Applicant: Sikorsky Aircraft Corporation, Stratford, CT (US)

(72) Inventors: George A. Mathew, Davis, CA (US); Amit Surana, West Hartford, CT (US); Luca F. Bertuccelli, Manchester, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 67 days.

(21) Appl. No.: 14/061,352

(22) Filed: Oct. 23, 2013

(65) Prior Publication Data

US 2015/0112549 A1   Apr. 23, 2015

(51) Int. Cl.
   G05D 1/00    (2006.01)
   G06K 9/00    (2006.01)
   G01S 13/88   (2006.01)

(52) U.S. Cl.
   CPC ......... G05D 1/0094 (2013.01); G06K 9/0063 (2013.01); *G01S 13/88* (2013.01)

(58) Field of Classification Search
   CPC ....... G01S 13/02; G01S 13/88; G05D 1/0094; G06K 9/0063
   See application file for complete search history.

(56) References Cited

U.S. PATENT DOCUMENTS

| | | | |
|---|---|---|---|
| 4,748,569 A | 5/1988 | Gordon | |
| 6,239,736 B1 | 5/2001 | McDonald et al. | |
| 7,605,774 B1 | 10/2009 | Brandt et al. | |
| 2003/0198364 A1* | 10/2003 | Yonover et al. | ............... 382/103 |
| 2004/0233414 A1* | 11/2004 | Jamieson et al. | ............ 356/4.01 |
| 2006/0015215 A1* | 1/2006 | Howard | ............... G05D 1/0094 700/245 |
| 2006/0085106 A1 | 4/2006 | Gaudiano et al. | |
| 2008/0269968 A1 | 10/2008 | Stewart | |
| 2010/0102992 A1 | 4/2010 | Cornett et al. | |
| 2010/0277587 A1 | 11/2010 | Pechatnikov et al. | |
| 2010/0283782 A1 | 11/2010 | He | |
| 2013/0085643 A1 | 4/2013 | Mathews | |
| 2013/0162632 A1* | 6/2013 | Varga et al. | ................... 345/419 |
| 2015/0066248 A1* | 3/2015 | Arbeit | .................... G01C 21/20 701/2 |

OTHER PUBLICATIONS

United States Coast Guard. "U.S. Coast Guard Addendum to the United States National Search and Rescue Supplement (NSS) to the International Aeronautical and Maritime Search and Rescue Manual (IAMSAR)", Jan. 2013.*
International Search Report for application PCT/US14/61474, dated Jul. 9, 2015, 9 pages.
Written Opinion for application PCT/US14/61474, dated Jul. 9, 2015, 5 pages.

* cited by examiner

Primary Examiner — Mussa A Shaawat
Assistant Examiner — Michael V Kerrigan
(74) Attorney, Agent, or Firm — Cantor Colburn LLP (57) ABSTRACT

A method of controlling a directional facing of a sensor mounted to a vehicle includes storing, by a sensor control computer, previously-searched locations of a terrain at which the sensor is directed. The method includes determining a likelihood of detecting a target at one or more points on the terrain and controlling a directional facing of the sensor onto the terrain based on the previously-searched locations and the likelihood of detecting the target.

19 Claims, 7 Drawing Sheets

LOCATIONAL AND DIRECTIONAL SENSOR CONTROL FOR SEARCH

BACKGROUND OF THE INVENTION

The subject matter disclosed herein relates to detecting objects in a terrain, and in particular to controlling a sensor that detects objects in the terrain.

Search and rescue systems utilize aircraft to find objects, such as people, animals or vehicles on terrain, which may include the ground (earth) or water, such as oceans, seas, lakes, etc. The aircraft include sensors, such as infrared sensors or cameras to search the terrain. Conventionally, a human pilot controls the aircraft or pre-planned search patterns are used, such as parallel line patterns, concentric circles, squares or other shapes, creeping line patterns, etc. A human operator controls the sensor as the aircraft follows its flight path in an attempt to locate the target in the terrain. However, it is difficult for a human operator to recognize any particular location on the terrain as having a higher likelihood of detecting the target than any other location on the terrain. As a result, the sensor searches the terrain in an inefficient manner, by searching areas with a low likelihood of detecting the target with the same frequency as areas with a high likelihood of detecting the target.

BRIEF DESCRIPTION OF THE INVENTION

According to one aspect of the invention, a method of controlling a directional facing of a sensor mounted to a vehicle includes storing, by a sensor control computer, previously-searched locations of a terrain at which the sensor is directed. The method includes determining a likelihood of detecting a target at one or more points on the terrain and controlling a directional facing of the sensor onto the terrain based on the previously-searched locations and the likelihood of detecting the target.

According to another aspect of the invention, a vehicle-based terrain search system includes a sensor configured to search terrain for a target and a sensor control computer configured to determine previously-searched locations of the terrain and to determine an optimal directional facing of the sensor based on the previously-searched locations and a likelihood of detecting the target at the optimal location.

Another aspect includes a vehicle-based terrain search system including a sensor control computer configured to determine previously-searched locations of a terrain at which a sensor is directed based on search history data stored in memory and sensor position input data, to determine a likelihood of detecting a target at one or more points on the terrain, to obtain a size of the target based on target size data stored in the memory, and to control a directional facing of the sensor onto the terrain based on the previously-searched locations, the likelihood of detecting the target, and the size of the target.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Conventional terrain-searching systems require operator control of sensors. Embodiments of the invention relate to methods and systems for controlling a terrain-searching sensor based on previously-searched locations and a likelihood of finding a target at a particular location in a terrain.

Figure 1:
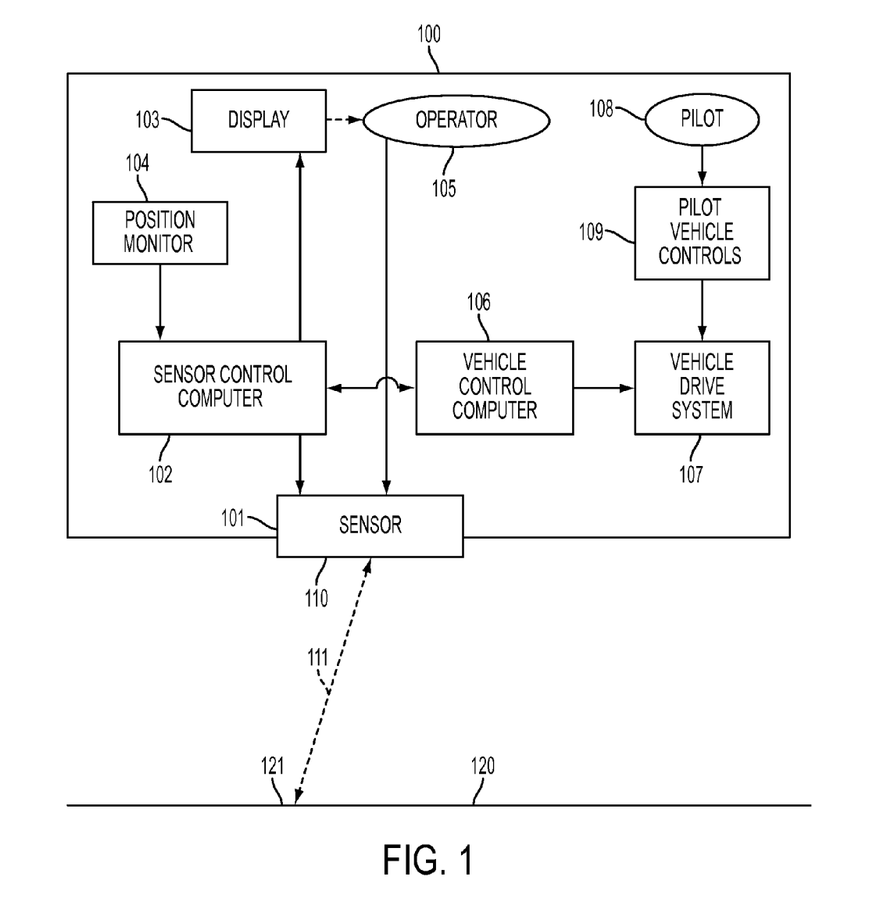
FIG. 1 illustrates a vehicle-based search system according to an embodiment of the invention.

FIG. 1 illustrates a vehicle-based search system 100 according to an embodiment of the invention. The system 100 may include any type of vehicle, including aircraft, watercraft and land vehicles. The system 100 includes a sensor 101 having a directionally-facing transmitting and/or receiving surface 110 that directs and/or receives sensor signals 111 to and/or from terrain 120. In one embodiment, the system 100 is an aircraft configured to search for a target 121 in terrain 120 beneath the aircraft over which the aircraft is flying. The aircraft may be a helicopter, airplane or any other type of aircraft. The terrain 120 may be land, water or any other type of terrain. In another embodiment, the system 100 includes a land-based vehicle and the terrain 120 is in the sky. In such an embodiment, the "terrain" 120 may be represented by data related to a plane or region defined by a predetermined height in the atmosphere or distance from the sensor 101. In yet another embodiment, the system 100 includes a watercraft, and the terrain 120 is either a bed of a body of water on which the watercraft is floating or the sky.

In embodiments of the invention, the sensor 101 may include any type of sensor capable of searching terrain 120 to find a target 121. Examples of sensors 101 include infrared sensors, visible-range cameras, other optical sensors, radar and other radio frequency sensors. Embodiments of the invention are not limited to any type of sensor, but rather to any sensor capable of detecting a target in terrain, and in particular to any sensor capable of being controlled to move across the terrain 120 to detect the target 121.

The system 100 includes a sensor control computer 102 to control a directional facing of the sensor 101 towards the terrain 120. In embodiments of the invention, the sensor control computer 102 controls the sensor 101 based on an algorithm including previously-searched locations on the terrain 120, which may be determined from position information provided by a position monitor 104 and by directional facing information of the sensor 101. The algorithm also takes into account a likelihood of finding the target 121 at a given location on the terrain 120. In particular, locations where it is more likely to find the target 121 may be searched more often than locations where it is less likely that the target 121 will be found, and locations that have already been searched may be searched less often than locations that have not yet been searched. In addition, a scale of the search tracks, or paths on the terrain 120 that have been searched by the sensor 101, may be considered in the algorithm. For example, if it is determined that a target 121 is relatively large, a space between adjacent search tracks may be relatively large, and if the target 121 is relatively small, then a space between adjacent search tracks may be relatively small.

In embodiments of the invention, the sensor 101 may be controlled based on a movement rate of the pan and tilt angles of the sensor 101, or in other words, the algorithm may take into account pan and tilt angle constraints of the sensor 101. In addition, the algorithm may take into account the speed of the vehicle in which the system 100 is housed, and the turn-rate of the vehicle.

The system 100 also includes a display device 103 for providing a display of search information to an operator 105. Display information may include images from the sensor 101, previous flight path information, future flight path information, regions searched and regions yet-to-be searched, vehicle information including speed, depth, altitude, and position, information about the target 121, such as previous location information, or the display information may include any other type of information of use to an operator 105.

In one embodiment of the invention, the sensor control computer 102 receives or accesses information regarding previously-searched locations on the terrain 120 and the likelihood of finding the target 121 at a location, and automatically controls the directional facing of the sensor 101 based on the information regarding previously-searched locations on the terrain 120 and the likelihood of finding the target 121 at a location on the terrain 120. In one embodiment, the sensor control computer 102 communicates with the vehicle control computer 106 to control the sensor 101 further based on a future movement plan of the system 100. For example, in an embodiment in which the system 100 includes an aircraft, the aircraft may be controlled by the vehicle control computer 106 to fly in a predetermined pattern, or the pilot 108 may manipulate the pilot controls 109 to control the aircraft to fly in a predetermined pattern designated in the vehicle control computer 106.

In another embodiment, the sensor control computer 102 receives or accesses information regarding previously-searched locations on the terrain 120 and the likelihood of finding the target 121 at a location, and outputs suggested controls to the display 103. In such an embodiment, the operator 105 manually controls the directional facing of the sensor 101 based on the suggested controls displayed on the display 103, which permits the operator 105 to adjust the suggested controls according to circumstances not captured by the sensor control algorithm.

In an embodiment of the invention, the pilot vehicle controls 109 and the vehicle control computer 106 are connected to the vehicle drive system 107, which may include engines, motors, rotors and any other drive to move the system 100. In one embodiment, both the sensor 101 and the vehicle drive system 107 are controlled based on an algorithm that takes into account previously-searched locations on the terrain 120 and the likelihood of finding the target 121 at a location on the terrain 120.

In one embodiment, the scale of the search, or the determination of the quality of coverage is calculated with respect to a probability distribution $\mu(x)$, where the integral of $\mu$ over a given region gives the probability of finding the object within the region and represents how well the region should be covered by the sensor, according to the following equation:

$$\Phi = \frac{1}{2} \sum_k \Lambda_k (c_k - \mu_k)^2$$

where $$\mu_k = \langle \mu, f_k \rangle$$

and $$\Lambda_k = \frac{1}{(1 + \|k\|^2)^{3/2}}$$

In the above equations, $\mu(x)$ is defined as a prior probability of distribution on a region, $c_k$ is a Fourier coefficient of the coverage distribution (which keeps track of history of where sensor has looked), and $\mu_k$ is a Fourier coefficient of the probability distribution $\mu$ and $k$ is a wavenumber vector of Fourier basis functions.

Figure 2A:
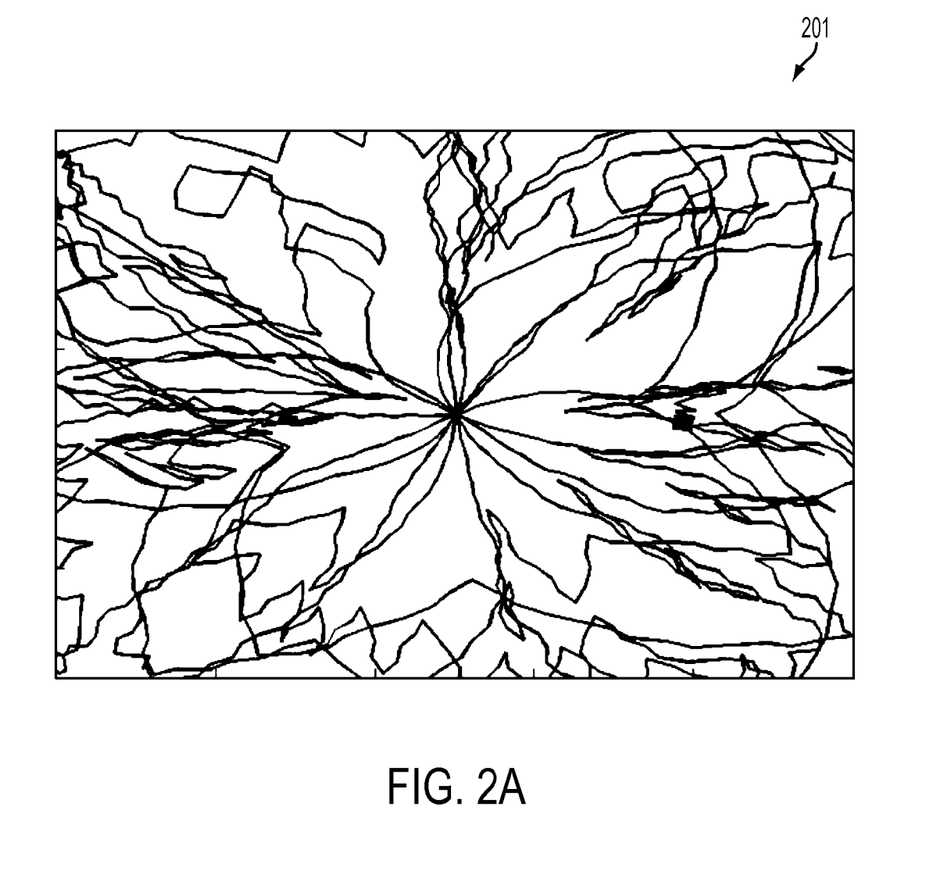
FIG. 2A illustrates a sensor track according to another embodiment of the invention.

FIG. 2A illustrates a search path pattern 201 according to an embodiment of the invention. In FIG. 2A, a vehicle including a sensor that generates the search path pattern 201 on terrain is a stationary vehicle, such as a hovering helicopter, an idling watercraft, or a stationary land vehicle. In FIG. 2A, no area is indicated as having a higher likelihood of containing the target. Therefore, the search path pattern 201 is substantially even or uniform across a terrain.

Figure 2B:
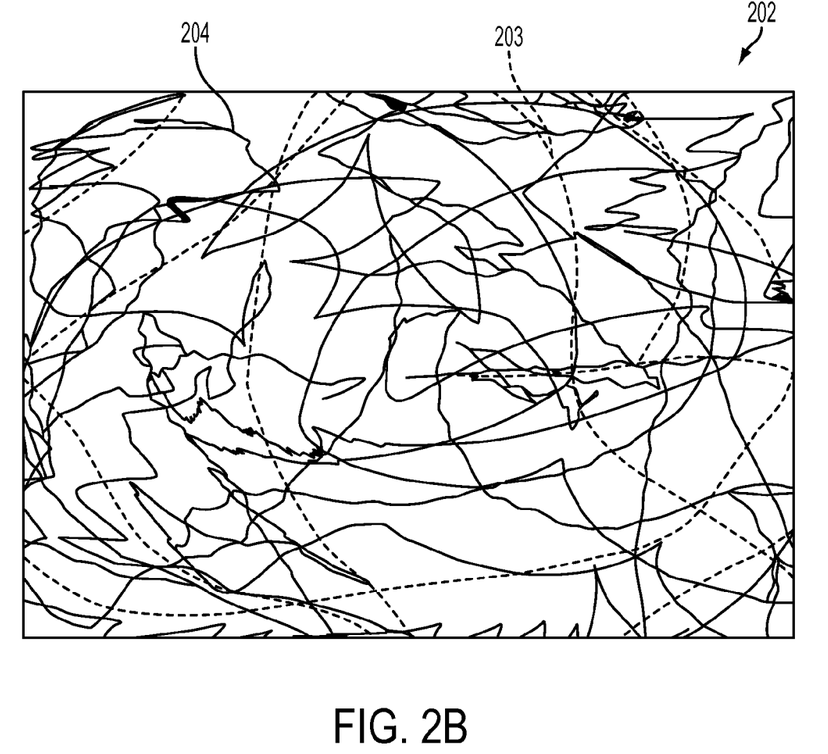
FIG. 2B illustrates a sensor track and flight path according to an embodiment of the invention.

FIG. 2B illustrates a search path pattern 202 according to another embodiment of the invention. In FIG. 2B, a vehicle including a sensor that generates the search path pattern 202 moves according to a predetermined algorithm. In particular, both the vehicle and the sensor mounted on the vehicle are controlled according to previously-searched locations and a likelihood of finding a target at any particular location, as well as based on a size of the target. In addition, the control system that controls the sensor may use an algorithm that takes into account a pan and tilt rate of the sensor, a speed of the vehicle, and a turn rate of the vehicle. Accordingly, the movement path of the vehicle 203 is illustrated with a dashed line, and the search path 204 of the sensor is illustrated with a solid line. In the embodiment illustrated in FIG. 2B, no area is designated as having a higher likelihood of containing the target, and therefore the movement pattern 203 of the vehicle and the search pattern 204 of the sensor are substantially even or uniform across the depicted region. In other words, the density of the search path 204 is substantially uniform within the entire search path pattern 202.

Figure 2C:
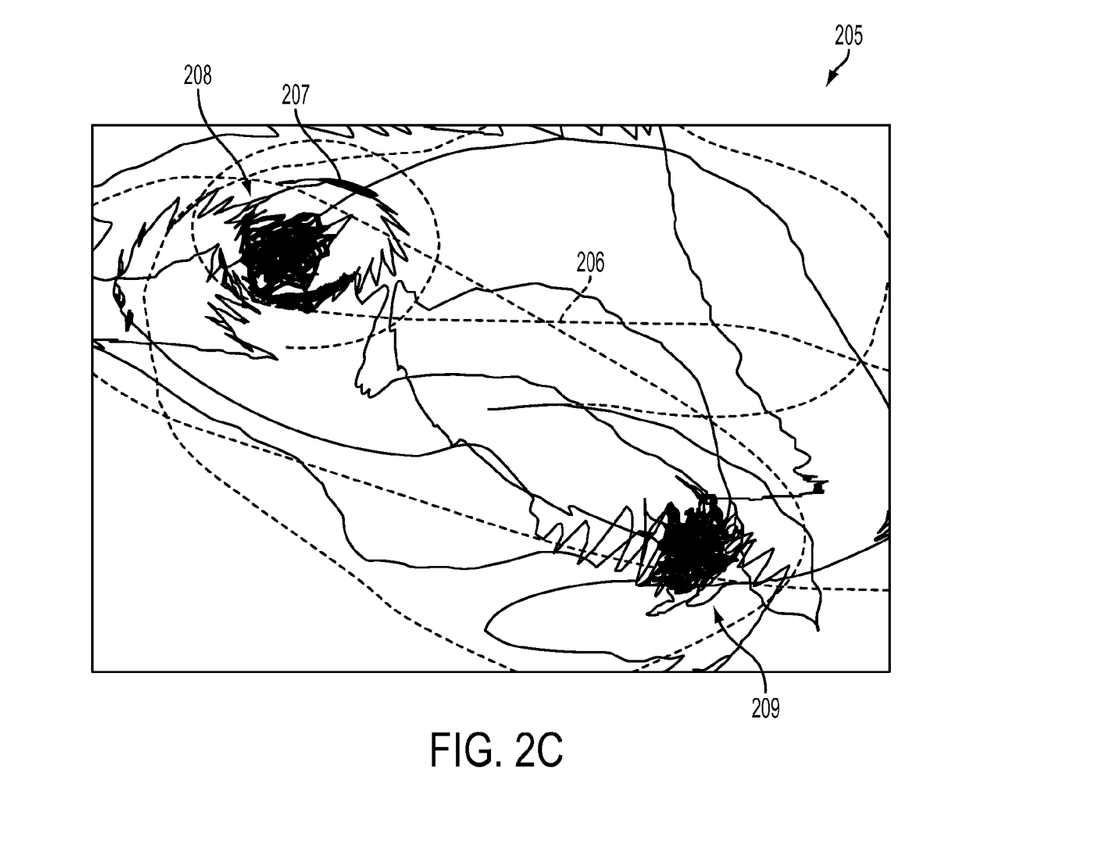
FIG. 2C illustrates a sensor track and flight path according to another embodiment of the invention.

FIG. 2C illustrates a search path pattern 205 according to another embodiment of the invention. In FIG. 2C, a vehicle including a sensor that generates the search path pattern 205 moves according to a predetermined algorithm. In particular, both the vehicle and the sensor mounted on the vehicle are controlled according to previously-searched locations and a likelihood of finding a target at any particular location, as well as based on a size of the target. Accordingly, the movement path of the vehicle 206 is illustrated with a dashed line, and the search path 207 of the sensor is illustrated with a solid line. In the embodiment illustrated in FIG. 2C, the areas 208 and 209 are designated as having a higher likelihood of containing the target than other areas. Therefore, the movement path 206 of the vehicle and the search path 207 of the sensor are denser around the area 208 than in other areas of the depicted region.

In embodiments of the invention, a density of the search paths in the regions 201, 202, and 205 may be adjusted according to a size of the object being searched-for. For example, a smaller object may result in denser search paths and a larger object in less-dense search paths.

Accordingly, embodiments of the invention encompass a control system that controls movement of a sensor and optionally a vehicle in which the sensor is housed based on one or more of previously-searched locations, a likelihood of detecting a target at a particular location, a size of the target, pan and tilt rates of the sensor, and a speed and turn rate of the vehicle.

Figure 3A:
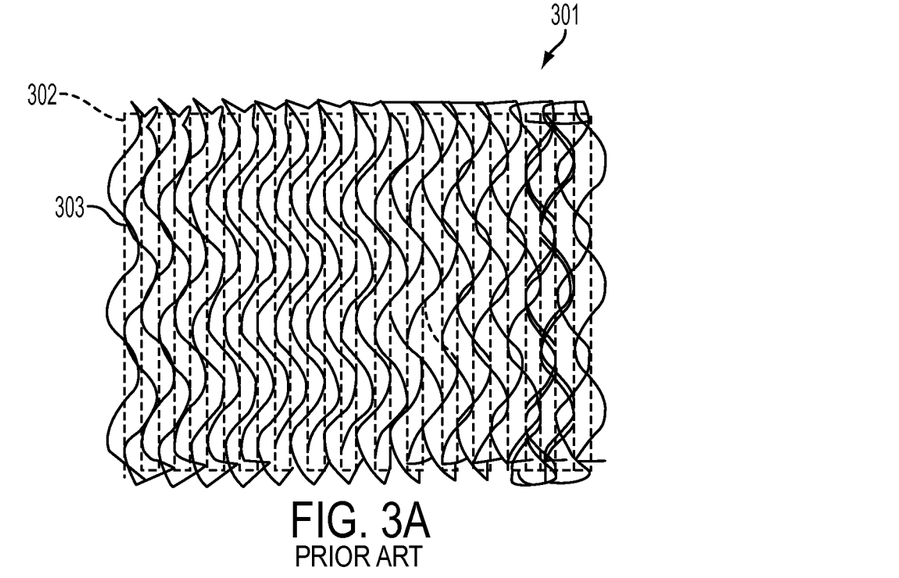
FIG. 3A illustrates a conventional sensor track and flight path.

While some embodiments of the invention have been described above with respect to a stationary vehicle and a vehicle that is controlled based on a likelihood of finding a target at a particular location, embodiments of the invention also encompass controlling a sensor when a pre-defined movement path of the vehicle is provided. FIG. 3A illustrates a prior art configuration in which a search pattern 301 is pre-programmed, and is not based on previously-searched locations or a likelihood of finding a target at any particular location, and is further not scaled according to a size of the target. Accordingly, the movement path 302 is a periodic "lawnmower pattern" that merely moves from one end of a region to the other, and back, being offset by a set distance with each traversal of the region. Likewise, the sensor search path 303 is a periodic slewing having a sinusoidal characteristic, representing the movement back and forth of the sensor as the vehicle moves. As illustrated in FIG. 3A, some portions of the sensor search path 303 significantly overlap other sections, without respect to the likelihood of finding a target in those sections.

Figure 3B:
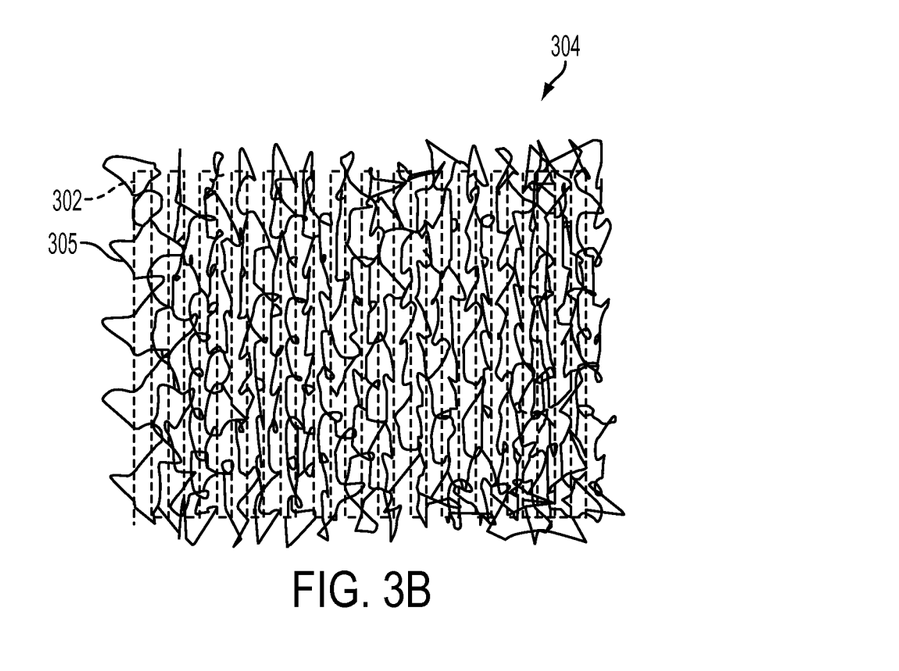
FIG. 3B illustrates a sensor track and flight path according to an embodiment of the invention.

FIG. 3B illustrates a search pattern 304 that incorporates scaling to take into account a size of the target to be detected and that takes into account areas previously searched to reduce the amount of overlap of the sensor search path 305. In FIG. 3B, the vehicle movement path 302 is still the "lawnmower pattern" that merely moves from one end of a region to the other, and back, being offset by a set distance with each traversal of the region until the entire region is covered. The sensor search path 305 has a pattern that is not a set periodic pattern, but is instead calculated to account for a size of the target and areas previously searched.

While various search patterns have been illustrated in FIGS. 2A, 2B, 2C 3A, and 3B, it is understood that embodiments of the invention encompass any combination of these search patterns. For example, in one embodiment, a sensor is controlled to have a search pattern based on a size of a target, a history of searched locations and a likelihood of finding a target in a terrain. In another embodiment, the sensor is further controlled based on a future movement path of a vehicle. The future movement path of the vehicle may be predicted based on a current flight path, based on a previous flight path, based on a pre-programmed flight path (such as the lawnmower pattern or other flight path pattern), or based on any other method. In another embodiment, both the sensor search path and the vehicle movement path are controlled based on a size of a target, a history of searched locations and a likelihood of finding a target in a terrain. In another embodiment, one or more of the above factors is omitted from the search pattern criteria.

Figure 4:
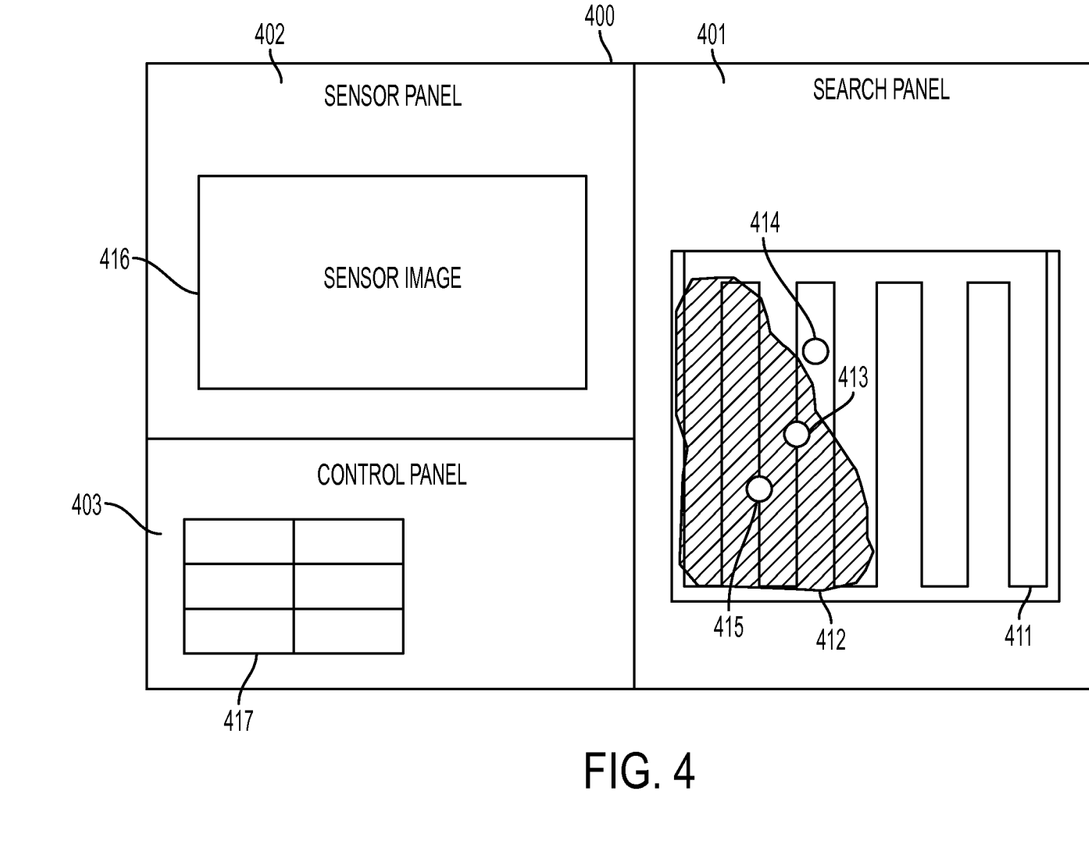
FIG. 4 is a user interface according to an embodiment of the invention.

As illustrated in FIG. 1, the vehicle-based search system 100 includes a display 103 for displaying search information to an operator 105. In some embodiments, the display 103 includes a user interface to provide information to the operator 105 and to permit the user to interact with the display 103 to change information displayed. FIG. 4 illustrates a user interface 400 according to embodiments of the invention. The user interface 400 may be an electronic display, such as a touch screen or other display with which an operator may interact, either by controlling devices, such as sensors and vehicle controls, by touching or interacting with a surface of the user interface 400, by entering data with a keyboard or mouse, or by any other method.

The user interface 400 includes a search panel 401, a sensor panel 402 and a control panel 403. The search panel 401 displays a movement track 411 of the vehicle, a "searched" region indicator 412, indicating a region that has already been searched, a present location icon 413 representing the present location of the vehicle, a suggested-sensor-position icon 414 representing a suggested orientation of the directional sensor, and a target icon 415 representing a last-known location of a target, or a location that has been determined to be the most likely location of the target.

In one embodiment, the operator 105 illustrated in FIG. 1 controls a position of the sensor 101 of FIG. 1 based on the suggested-sensor-position icon 414 of FIG. 4. In such an embodiment, the position of the suggested-sensor-position icon 414 is calculated based on previously-searched locations, a likelihood of finding the target, a size of the target, pan and tilt rates of the sensor, a speed and turn rate of the vehicle in which the sensor is housed, predicted response times of the operator, and any other criteria. While the "lawnmower" pattern of vehicle movement is illustrated as an example in FIG. 4, the search panel 401 may display any vehicle movement pattern, including pre-programmed vehicle movement patterns and vehicle movement patterns that are predicted based on past movement of the vehicle. In embodiments of the invention, the search panel 401 may display past vehicle movement tracks as well as future vehicle movement tracks corresponding to planned or predicted vehicle movements.

While some features of the search panel 401 have been provided by way of example, it is understood that other features may be displayed, such as regions in which it has been determined that there is a higher likelihood of an object being located. Such a region may be illustrated by varying colors, shades, line patterns, or any other display. A search control system may automatically update the search panel 401 as areas are searched, as the vehicle moves, as the sensor moves, as conditions change in a search area, or based on any other changes.

The sensor panel 402 includes an image 416 generated by the sensor. For example, in an embodiment in which the sensor is an infrared sensor, an infrared-based image may be displayed of the area of terrain currently being searched by the sensor. The sensor panel 402 may also include various imaging controls including zoom and focus controls. The sensor panel may also include control buttons, such as pan and tilt controls to move the sensor. The sensor panel 402 may further include data displays, including sensor characteristics, location data, sensor tilt and pan data, zoom data and any other desired data.

The control panel 403 includes additional control buttons 417 and displays, including buttons to control sensor control patterns (such as periodic pattern control, target scale sensor control according to embodiments of the invention, or any other sensor control patterns). Other buttons may include target detection modes (auto detection of a computer having access to the sensor images or manual detection by an operator), slew parameters of a sensor, or any other desired controls.

Figure 5:
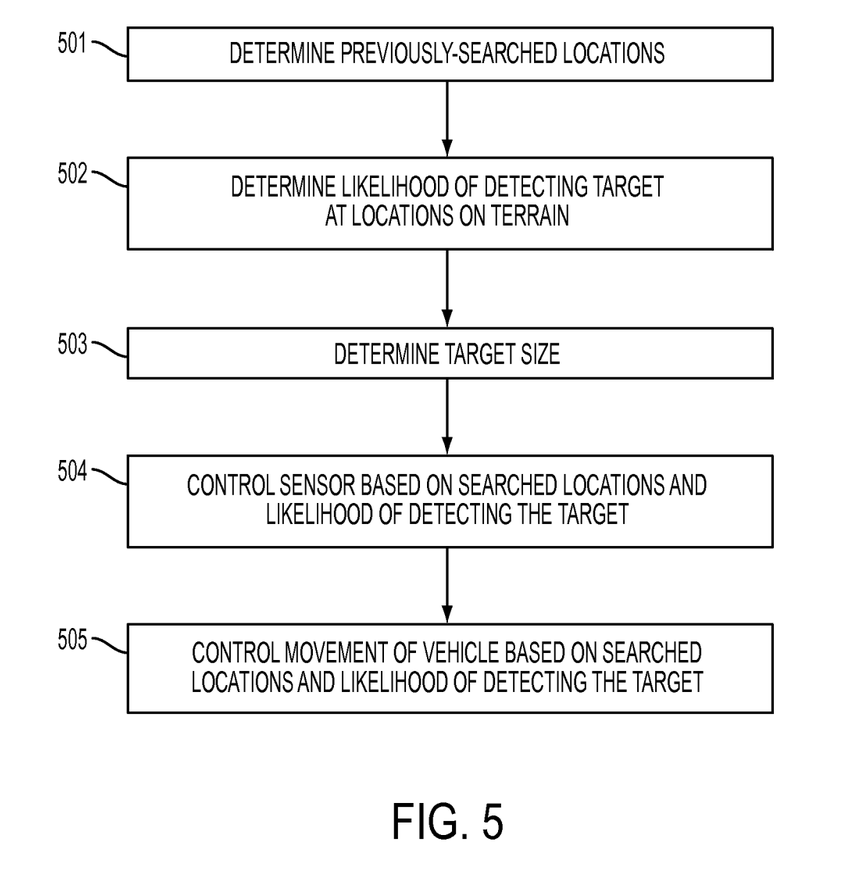
FIG. 5 is a flowchart of a method according to an embodiment of the invention.

FIG. 5 is a flowchart illustrating a method of performing a search, according to an embodiment of the invention. The method includes determining, in block 501, which locations have been previously searched. This determination may be tracked over time by a positioning system, such as a global positioning system (GPS) combined with information regarding a directional facing of a sensor.

In block 502, the likelihood of detecting a target at locations on a terrain is determined. For example, if a transmission was received from particular coordinates, the corresponding location may be designated as having a high probability of finding the target, and zones of probability of finding the target may be configured concentrically from the particular coordinates, such that the probability of finding the target decreases as a distance from the particular coordinates decreases. The likelihood of detecting the target may also be based on terrain conditions and features, such as elevation and roughness of terrain on land and water currents of water terrain. The likelihood of detecting the target may also be based on information about target movement, such as the last known speed or acceleration of the target.

In block 503, a size of the target is obtained. For example, the size of the target may be determined by receiving an input from memory storage, from a user or by any other input means. In block 504, a directional facing of a sensor is controlled based on the previously-searched location information, the likelihood of detecting the target, and the size of the target. In particular, the sensor is controlled to search areas having a higher likelihood of finding the target more often or with a greater search path density than regions where the likelihood of finding the target is low. In addition, spaces between the search paths are controlled based on the target size, such that the spaces are larger when the target is larger, and the spaces are smaller when the target is smaller. The sensor may also be controlled based on future vehicle path information, such as a pre-programmed vehicle movement path or a predicted vehicle movement path.

In one embodiment, the sensor is automatically controlled by a sensor control computer which controls the sensor based on the previously-searched information, the likelihood of finding the target information, and the target size information. In another embodiment, a computer generates a suggested sensor position and displays the suggested sensor position to an operator who controls the directional facing of the sensor.

In some embodiment, a movement of the vehicle on which the sensor is mounted is also controlled, in block 505, based on the previously-searched information, the likelihood of finding the target information, and the target size information. In other words, the sensor movement and the vehicle movement may be coordinated to maximize a search effectiveness based on the previously-searched information, the likelihood of finding the target information, and the target size information.

Embodiments of the invention relate to any sensor mounted to any vehicle, where the sensor is configured to sweep across a terrain to detect a target. In one embodiment, the vehicle is an aircraft, such as a helicopter, and the sensor is mounted to the aircraft, such as a forward-looking infrared (FLIR) sensor. In one embodiment, a sensor control computer on the aircraft controls the directional facing of the sensor based on previously-searched location information, a likelihood of finding a target and a size of the target. The sensor control computer may also control the directional facing of the sensor based on future movement paths of the aircraft, such as a pre-programmed flight plan of the aircraft or a predicted flight path of the aircraft.

Embodiments of the invention encompass vehicles, sensor systems, and methods for implementing the control of a sensor based on previously-searched location information, a likelihood of finding a target and a size of the target. Embodiments also relate to computer-readable media, such as memory, flash chips, flash drives, hard disks, optical disks, magnetic disks, or any other type of computer-readable media capable of storing a computer program to control a sensor control computer based on previously-searched location information, a likelihood of finding a target and a size of the target. The computer-readable media may also be configured to control a vehicle control computer to control a movement path of the vehicle based on previously-searched location information, a likelihood of finding a target and a size of the target.

According to embodiments of the invention, targets may be detected in a terrain with increased efficiency, including with greater frequency and in less time than in systems utilizing a periodic sweeping of an area with a sensor. Embodiments of the invention provide an operator of a sensor system with greater guidance to control a sensor and permit the operator to focus more on detection of a target than controlling a position of a sensor.

While embodiments of the invention have been described with respect to a vehicle and a sensor, it is understood that embodiments encompass coordinating search patterns of multiple sensors and multiple vehicles. In one embodiment, multiple vehicles each include communications modules, such as radio transceivers, to communicate with each other. Flight control computers and sensor control computers of the respective vehicles may communicate with each other to coordinate optimal flight paths and sensor search paths based on previously-searched locations, the likelihood of finding an object at a particular location, a size of the object, pan and tilt rates of sensors, speeds and turn rates of vehicles, or any other criteria. In another embodiment, the vehicles may have pre-programmed flight paths and search path patterns that are configured to complement each other, or to simultaneously search different locations within a search area.

In addition, while embodiments of the invention have been described with respect to tracking an object, it is understood that embodiments encompass the tracking of, or searching for, any number of objects simultaneously. The multiple objects may be in different locations, of different sizes, moving in different patterns, or may have any other characteristics and dimensions that are either the same or different.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of controlling a directional facing of a sensor mounted to a vehicle, comprising:

storing, by a sensor control computer, previously-searched locations of a terrain at which the sensor is directed;
determining, by the sensor control computer, a quality of coverage based on a probability distribution to determine a probability of detecting a target at one or more locations in the terrain in response to a target transmission;
controlling a directional facing of the sensor onto the terrain based on the previously-searched locations and the probability of detecting the target in the terrain; and
controlling a vehicle drive system based on the previously searched locations and the probability of detecting the target in the terrain, wherein the sensor control computer automatically controls the directional facing of the sensor based on the previously-searched locations and the probability of detecting the target, wherein the sensor is directed to regions on the terrain where it is less likely that the target will be found and to regions on the terrain where it is more likely that the target will be found with the sensor being directed to the regions where it is less likely that the target will be found less often than to the regions where it is more likely that the target will be found.

2. The method of claim 1, wherein the directional facing of the sensor is adapted according to a movement plan of the vehicle.

3. The method of claim 1, wherein the directional facing of the sensor is also based on terrain features.

4. The method of claim 3, wherein the terrain is water, and the terrain features include water currents.

5. The method of claim 1, further comprising:
displaying on a display device suggested directional facings for the sensor based on the previously-searched locations and the probability of detecting the target.

6. The method of claim 1, further comprising:
displaying on a display device locations on the terrain that have been previously searched by the sensor.

7. The method of claim 1, further comprising:
obtaining a size of the target; and
configuring spaces between directional-facing paths of the sensor based on the size of the target.

8. The method of claim 1, wherein controlling the directional facing of the sensor includes simultaneously controlling the directional facing of two or more sensors to face different locations to simultaneously search the different locations.

9. The method of claim 8, further comprising:
simultaneously controlling two or more vehicles, each vehicle having a separate one of the two or more sensors, such that movement patterns of the two or more vehicles and directional facings of the two or more sensors are coordinated to simultaneously search different locations within a search area.

10. The method of claim 1, wherein determining, by the sensor control computer, a quality of coverage based on the probability distribution to determine the probability of detecting the target at one or more locations in the terrain is further in response to terrain conditions.

11. A vehicle-based terrain search system, comprising:
a sensor mounted to a vehicle and configured to search terrain for a target;
a sensor control computer configured to determine previously-searched locations of the terrain and to determine an optimal directional facing of the sensor based on the previously-searched locations and a quality of coverage based on a probability distribution to determine a probability of detecting the target at the optimal directional facing, the probability of detecting the target at the optimal location determined in response to a target transmission, wherein the sensor control computer automatically controls the directional facing of the sensor and a vehicle drive system based on the previously-searched locations and the probability of detecting the target, wherein the sensor is directed to regions on the terrain where it is less likely that the target will be found and to regions on the terrain where it is more likely that the target will be found with the sensor being directed to the regions where it is less likely that the target will be found less often than to the regions where it is more likely that the target will be found.

12. The system of claim 11, wherein the optimal directional facing is further based on a future movement plan of the vehicle.

13. The system of claim 11, further comprising a display device for displaying suggested directional facings for the sensor based on the previously-searched locations and the probability of detecting the target.

14. The system of claim 11, further comprising a display device for displaying locations on the terrain that have been previously searched by the sensor.

15. The system of claim 11, further comprising a vehicle control computer to control a movement path of the vehicle based on the previously-searched locations and the probability of detecting the target.

16. The system of claim 11, wherein the sensor control computer is configured to determine a size of the target and to configure spaces between tracks on the terrain corresponding to searched locations of the sensor based on the size of the target.

17. A vehicle-based terrain search system, comprising:
a sensor control computer configured to determine previously-searched locations of a terrain at which a sensor is directed based on search history data stored in memory and sensor position input data, to determine a quality of coverage based on a probability distribution to determine a probability of detecting a target at one or more points on the terrain, to obtain a size of the target based on target size data stored in the memory, to control a directional facing of the sensor onto the terrain and a vehicle drive system based on the previously-searched locations, the probability of detecting the target, and the size of the target, the probability of detecting the target determined in response to a target transmission, wherein the sensor is directed to regions on the terrain where it is less likely that the target will be found and to regions on the terrain where it is more likely that the target will be found with the sensor being directed to the regions where it is less likely that the target will be found less often than to the regions where it is more likely that the target will be found.

18. The system of claim 11, wherein the probability of detecting the target at the optimal location is further determined in response to terrain conditions.

19. The system of claim 18, wherein the probability of detecting the target is further determined in response to terrain conditions.

* * * * *